US008932134B2

(12) United States Patent
Andall

(10) Patent No.: US 8,932,134 B2
(45) Date of Patent: Jan. 13, 2015

(54) SYSTEM AND METHOD OF AUDIO PROCESSING

(75) Inventor: Hogarth Andall, London (GB)

(73) Assignee: Sony Computer Entertainment Europe Limited (GB)

( * ) Notice: Subject to any disclaimer, the term of this patent is extended or adjusted under 35 U.S.C. 154(b) by 521 days.

(21) Appl. No.: 12/866,274

(22) PCT Filed: Jan. 23, 2009

(86) PCT No.: PCT/GB2009/000185
§ 371 (c)(1),
(2), (4) Date: Aug. 5, 2010

(87) PCT Pub. No.: WO2009/103940
PCT Pub. Date: Aug. 27, 2009

(65) Prior Publication Data
US 2010/0323793 A1 Dec. 23, 2010

(30) Foreign Application Priority Data
Feb. 18, 2008 (GB) .................................. 0802939.9

(51) Int. Cl.
*A63F 9/24* (2006.01)
*A63F 13/40* (2014.01)
*H04S 7/00* (2006.01)

(52) U.S. Cl.
CPC ......... *H04S 7/303* (2013.01); *A63F 2300/8088* (2013.01); *H04S 7/301* (2013.01); *A63F 2300/6081* (2013.01); *H04S 2400/11* (2013.01); *A63F 13/10* (2013.01)
USPC ................ 463/35; 381/58; 381/300; 381/303

(58) Field of Classification Search
CPC ..... H04S 7/303; H04S 7/301; H04S 2420/03; H04R 2430/21; H04R 29/005; H04R 5/00; A63F 2300/6081
USPC ............................... 463/35; 381/58, 300, 303
See application file for complete search history.

(56) References Cited

U.S. PATENT DOCUMENTS 6,118,880 A * 9/2000 Kokkosoulis et al. ........ 381/303
7,929,720 B2 * 4/2011 Ishibashi et al. .............. 381/300
(Continued)

FOREIGN PATENT DOCUMENTS

| JP | 9130900 A | 5/1997 |
|---|---|---|
| WO | 0167814 A2 | 9/2001 |

(Continued)

OTHER PUBLICATIONS

International Search Report and Written Opinion, PCT/GB2009/000185, dated Apr. 16, 2009.
(Continued)

*Primary Examiner* — Steve Rowland
(74) *Attorney, Agent, or Firm* — Lerner, David, Littenberg, Krumholz & Mentlik, LLP

(57) ABSTRACT

A method of audio processing for an entertainment device operable to communicate with a game controller, the method comprising the steps of generating a source sound for reproduction by a plurality of loudspeakers at a current position where acoustic signals from the plurality of loudspeakers are coincident (hereafter referred to as a 'sweet spot'), requesting that the user steers the sound using the game controller until the user considers the sound to be centered upon them, and interpreting user inputs from the game controller to adjust the output timing of the source sound data signals for reproduction by respective ones of the plurality of loudspeakers in accordance with the user directional inputs so as to move the sweet spot.

22 Claims, 13 Drawing Sheets

(56) References Cited

U.S. PATENT DOCUMENTS

| | | |
|---|---|---|
| 2005/0179701 A1* | 8/2005 | Jahnke .......................... 345/619 |
| 2006/0062410 A1 | 3/2006 | Kim et al. |
| 2006/0239471 A1 | 10/2006 | Mao et al. |
| 2007/0011196 A1 | 1/2007 | Ball et al. |
| 2007/0116306 A1* | 5/2007 | Riedel et al. .................. 381/303 |
| 2007/0154019 A1 | 7/2007 | Kim |
| 2007/0253561 A1* | 11/2007 | Williams et al. ................ 381/58 |
| 2008/0044038 A1 | 2/2008 | Houle |
| 2008/0130923 A1* | 6/2008 | Freeman ....................... 381/303 |

FOREIGN PATENT DOCUMENTS

| | | |
|---|---|---|
| WO | 2006/033074 A1 | 3/2006 |
| WO | 2008/032255 A2 | 3/2008 |

OTHER PUBLICATIONS

Examination Report for GB Application No. 0802939.9 dated Dec. 2, 2009.

Search Report from GB Application No. 0802939.9 dated May 30, 2008.

* cited by examiner

SYSTEM AND METHOD OF AUDIO PROCESSING

CROSS REFERENCE TO RELATED APPLICATIONS

The present application is a national phase entry under 35 U.S.C. §371 of International Application No. PCT/GB2009/000185, filed Jan. 23, 2009, published in English, which claims the benefit of GB Patent Application No. 0802939.9, filed Feb. 18, 2008. The entire disclosure of each of the above-identified applications is incorporated by reference herein.

The present invention relates to a system and method of audio processing.

In conventional domestic surround-sound audio systems, a source of surround-sound data, such as a DVD or Blu-Ray® disc player or a videogame console provides a plurality of audio data channels to a digital amplifier. The amplifier typically converts the audio data into a plurality of analogue signals and amplifies them for output to respective loudspeakers (speakers) arranged within a room containing the system.

Referring now to FIGS. 1A, 1B and 1C of the accompanying drawings, typical surround-sound configurations are known respectively as 5.1, 6.1 and 7.1 surround sound configurations. The '.1' refers to the subwoofer (a special loudspeaker for low frequency signals) whilst the 5, 6 or 7 refers to the number of other loudspeakers. The speaker positions, depending on the configuration, are left front (LF), centre front (CF), right front (RF), left back (LB), centre back (CB), right back (RB), left side (LS) right side (RS) and sub woofer (SW). Generally the position of the subwoofer is not specified, as people have difficulty localising very low audio frequencies and hence its position is relatively unimportant. A user 2000 in a chair 2010 is shown in schematic plan view. This same schematic representation of user and chair will be used in the remaining drawings described below.

For simplicity the 5.1 arrangement will be discussed further whilst appreciating that the following is also applicable to other surround sound arrangements. Referring now to FIG. 2 of the accompanying drawings, in this figure a person is sat in a chair in a room equipped with a 5.1 channel surround sound system. In order to properly hear the reproduced 5.1 surround sound, the person is sat at the so-called 'sweet spot' 1010. The sweet spot is defined as the point in a room where audio signals from the loudspeakers that were originally simultaneous source signals are all co-incident; i.e. the point in the room where simultaneous source signals sound simultaneous to the listener. As shown in FIG. 2, in reality the sweet spot is generally not considered to be a single point in space, but rather is a small region, shown schematically in the plan view of FIG. 2 as a small circular region; in three dimensions the sweet spot for the system of FIG. 2 might well approximate to a part of a cylinder. Returning to the two dimensional discussion, to arrange the position of this sweet spot in a room so that it is centred at a desired listening position, it is necessary to take account of the relative distances (d1, . . . d6) between the loudspeakers and the listening position in order to add relative delays to each speaker channel and so synchronise the arrival at the listening position of sounds that are supposed to be synchronised. Likewise for faithful reproduction of the surround sound recording it is also preferable to determine the relative amplitudes of the loudspeakers (a1, . . . a6); for example if they are not properly matched or are made by different manufacturers, then the sound output (e.g. in decibels) for a given electrical input may differ between them. The perceived output level at the listening position will also be a function of distances d1, . . . d6. Finally, the frequency response of the loudspeakers (f1, . . . f6) should be taken into account; again, different manufacturers produce loudspeakers with different frequency responses, and even where identical loudspeakers are used, interactions with features of the room can serve to enhance or suppress certain frequencies for different speaker positions.

Consequently, calibrating a surround sound system to sound subjectively correct at a desired listening position is a potentially complex process requiring many listening sessions by the user and a comparatively complex user interface on the amplifier to enable modification of the above parameters.

To simplify this process, many modern amplifiers provide an automatic configuration system. Manufacturers such as Sony® provide a microphone that can be linked to the amplifier. The amplifier then generates a wide spectrum signal such as white or pink noise for each loudspeaker channel. By holding the microphone at the desired listening position, the distance of each speaker from this position can be determined using autocorrelation in the amplifier. In addition, the relative amplitude of each speaker can be gauged from the received signal level at the microphone, and the frequency response of each speaker can be determined by how it shapes the noise signal (typically by measuring the received energy levels in, say, seven frequency bands spanning the output spectrum).

Using this information, the amplifier can then: configure delays in one or more of the audio channels to equalise effective distance between the speakers and the sweet spot; set amplification offsets to equalise effective (perceived) loudness of the different speakers at the sweet spot; and set graphic or parametric equalisers to equalise effective frequency response of the speakers; all in order to correct for the configuration of room, loudspeakers and user position. The result is to place the sweet spot at the desired listening position, with originally simultaneous source data signals reaching the listening position as acoustic signals from the loudspeakers substantially simultaneously and substantially at the correct relative volume levels.

It is generally accepted that for home cinema, this sweet spot is relatively localised. Referring to FIG. 3 of the accompanying drawings, it will be clear that of the three people watching a movie on a screen 300, only the person in the centre will receive the properly balanced output; for example the person on the left will receive the signal from the LF speaker early (due to the distance d1− between the speaker LF and the user drawn on the left of the diagram being less than the distance d1 between the speaker LF and the central user), and the signal from the RF speaker late (due to the increased distance d2+), and vice-versa for the person on the right (similar changes will occur for d3, . . . d6, not shown). The relative amplitude levels will also appear unbalanced. The psychoacoustic effect of receiving an audio signal from two sources, one of which precedes the other by a few milliseconds, is to perceive this earlier source as the primary source. Indeed, some sound reinforcement or public address systems add a small delay to the amplified signal for this reason, to give the impression that the person talking is still the source of the amplified signal. Consequently the left and right users will perceive a heavily distorted version of the intended distribution of sounds within the reproduced audio field (generally known as the 'soundstage'). A similar problem is encountered if a lone user chooses to sit outside the central sweet spot without re-running the auto configuration procedure. Clearly this is undesirable.

The present invention aims to mitigate or alleviate the above problems.

In a first aspect of the present invention, a method of audio processing for an entertainment device operable to communicate with a game controller comprises the steps of generating a source sound for reproduction by a plurality of loudspeakers at a current position where acoustic signals from the plurality of loudspeakers are coincident (hereafter referred to as a 'sweet spot'), requesting that the user steers the sound using the game controller until the user considers the sound to be centred upon them, and interpreting user inputs from the game controller to adjust the output timing of the source sound data signals for reproduction by respective ones of the plurality of loudspeakers in accordance with the user inputs from the game controller so as to move the sweet spot.

In another aspect of the present invention, an entertainment device comprises a generator of a source sound for reproduction by a plurality of loudspeakers at a current position where acoustic signals from the plurality of loudspeakers are coincident (hereafter referred to as a 'sweet spot'), a multi-channel delay operable to adjust delays applied to the plurality of loudspeakers, thereby adjusting the position of the sweet spot, and communication means for receiving user inputs from a remote game controller, in which the multi-channel delay is operable to adjust the output timing of the source sound data signals for reproduction by respective ones of the plurality of loudspeakers in accordance with the user inputs so as to move the sweet spot.

Advantageously therefore the sweet spot is able to be located where the user currently happens to be, rather than on a static position determined during an initial configuration of the amplifier. This provides considerable flexibility for example when two people take turns playing a game, as the sweet spot can be centred over the current player.

Further respective aspects and features of the invention are defined in the appended claims.

Embodiments of the present invention will now be described by way of example with reference to the accompanying drawings, in which.

A system and method of audio processing are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

In an example embodiment of the present invention, the amplifier of a surround sound system has previously been calibrated to provide a well-balanced 'sweet spot' at a central listening position, as described previously. The source for the surround-sound signal is a Sony® Playstation 3® (PS3®) entertainment device running a game application. A video camera is arranged to communicate with the PS3. The PS3 is then operable to analyse the video image to determine where the player of the game is actually positioned with respect to this sweet spot, and to introduce into the source audio data to be sent to the amplifier further signal delays and amplitude modifications that will serve to relocate the (estimated) sweet spot to (or at least towards) the currently observed (i.e. estimated) position of the user. In this way the user can experience an immersive sound stage even if they are not perfectly centred on the default sweet-spot as set by the amplifier.

Figure 4:
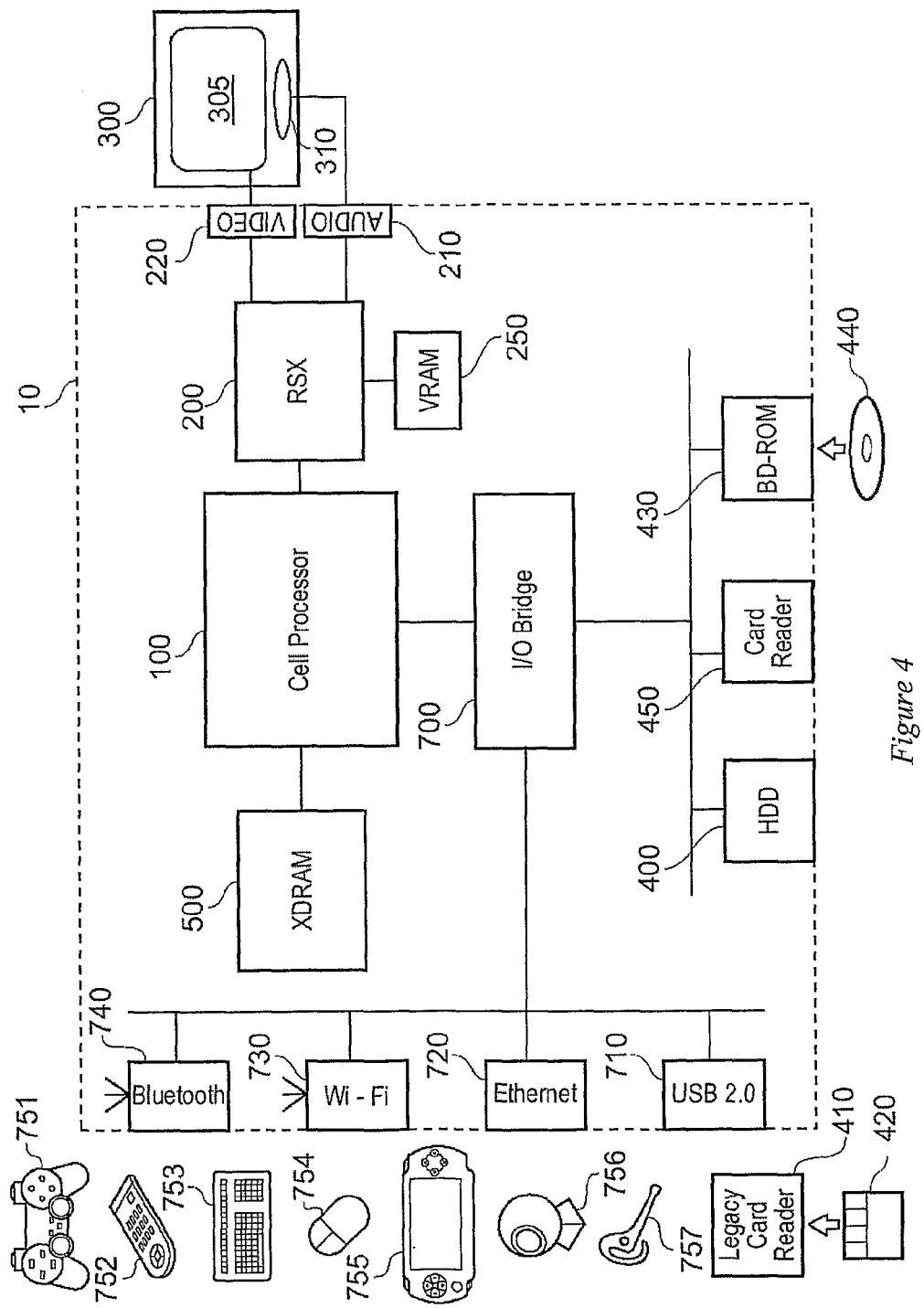
FIG. 4 is a schematic diagram of an entertainment device.

FIG. 4 schematically illustrates the overall system architecture of the Sony® Playstation 3® entertainment device. A system unit 10 is provided, with various peripheral devices connectable to the system unit.

The system unit 10 comprises: a Cell processor 100; a Rambus® dynamic random access memory (RDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

Figure 5:
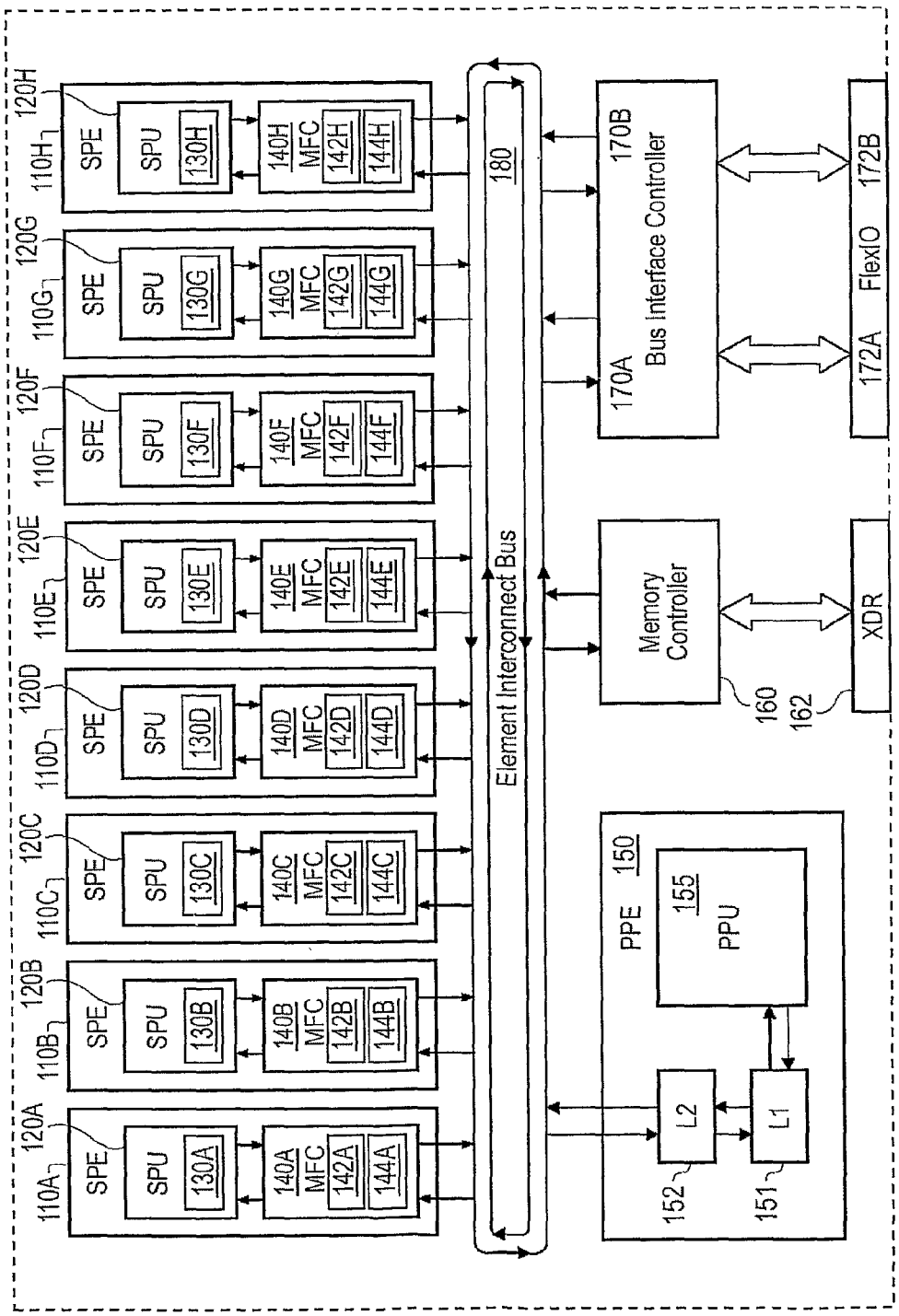
FIG. 5 is a schematic diagram of a cell processor.

Referring now to FIG. 5, the Cell processor 100 has an architecture comprising four basic components: external input and output structures comprising a memory controller 160 and a dual bus interface controller 170A,B; a main processor referred to as the Power Processing Element 150; eight co-processors referred to as Synergistic Processing Elements (SPEs) 110A-H; and a circular data bus connecting the above components referred to as the Element Interconnect Bus 180. The total floating point performance of the Cell processor is 218 GFLOPS, compared with the 6.2 GFLOPs of the Playstation 2 device's Emotion Engine.

The Power Processing Element (PPE) 150 is based upon a two-way simultaneous multithreading Power 970 compliant PowerPC core (PPU) 155 running with an internal clock of 3.2 GHz. It comprises a 512 kB level 2 (L2) cache and a 32 kB level 1 (L1) cache. The PPE 150 is capable of eight single position operations per clock cycle, translating to 25.6 GFLOPs at 3.2 GHz. The primary role of the PPE 150 is to act as a controller for the Synergistic Processing Elements 110A-H, which handle most of the computational workload. In operation the PPE 150 maintains a job queue, scheduling jobs for the Synergistic Processing Elements 110A-H and monitoring their progress. Consequently each Synergistic Processing Element 110A-H runs a kernel whose role is to fetch a job, execute it and synchronise with the PPE 150.

Each Synergistic Processing Element (SPE) 110A-H comprises a respective Synergistic Processing Unit (SPU) 120A-H, and a respective Memory Flow Controller (MFC) 140A-H comprising in turn a respective Dynamic Memory Access Controller (DMAC) 142A-H, a respective Memory Management Unit (MMU) 144A-H and a bus interface (not shown). Each SPU 120A-H is a RISC processor clocked at 3.2 GHz and comprising 256 kB local RAM 130A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 120A-H does not directly access the system memory XDRAM 500; the 64-bit addresses formed by the SPU 120A-H are passed to the MFC 140A-H which instructs its DMA controller 142A-H to access memory via the Element Interconnect Bus 180 and the memory controller 160. The Element Interconnect Bus (EIB) 180 is a logically circular communication bus internal to the Cell processor 100 which connects the above processor elements, namely the PPE 150, the memory controller 160, the dual bus interface 170A,B and the 8 SPEs 110A-H, totaling 12 participants. Participants can simultaneously read and write to the bus at a rate of 8 bytes per clock cycle. As noted previously, each SPE 110A-H comprises a DMAC 142A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilisation through arbitration between participants. This equates to a theoretical peak bandwidth of 307.2 GB/s (gigabytes per second) at a clock rate of 3.2 GHz.

The memory controller 160 comprises an XDRAM interface 162, developed by Rambus Incorporated. The memory controller interfaces with the Rambus XDRAM 500 with a theoretical peak bandwidth of 25.6 GB/s.

The dual bus interface 170A,B comprises a Rambus FlexIO® system interface 172A,B. The interface is organised into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B.

Data sent by the Cell processor 100 to the Reality Simulator graphics unit 200 will typically comprise display lists, being a sequence of commands to draw vertices, apply textures to polygons, specify lighting conditions, and so on.

Figure 6:
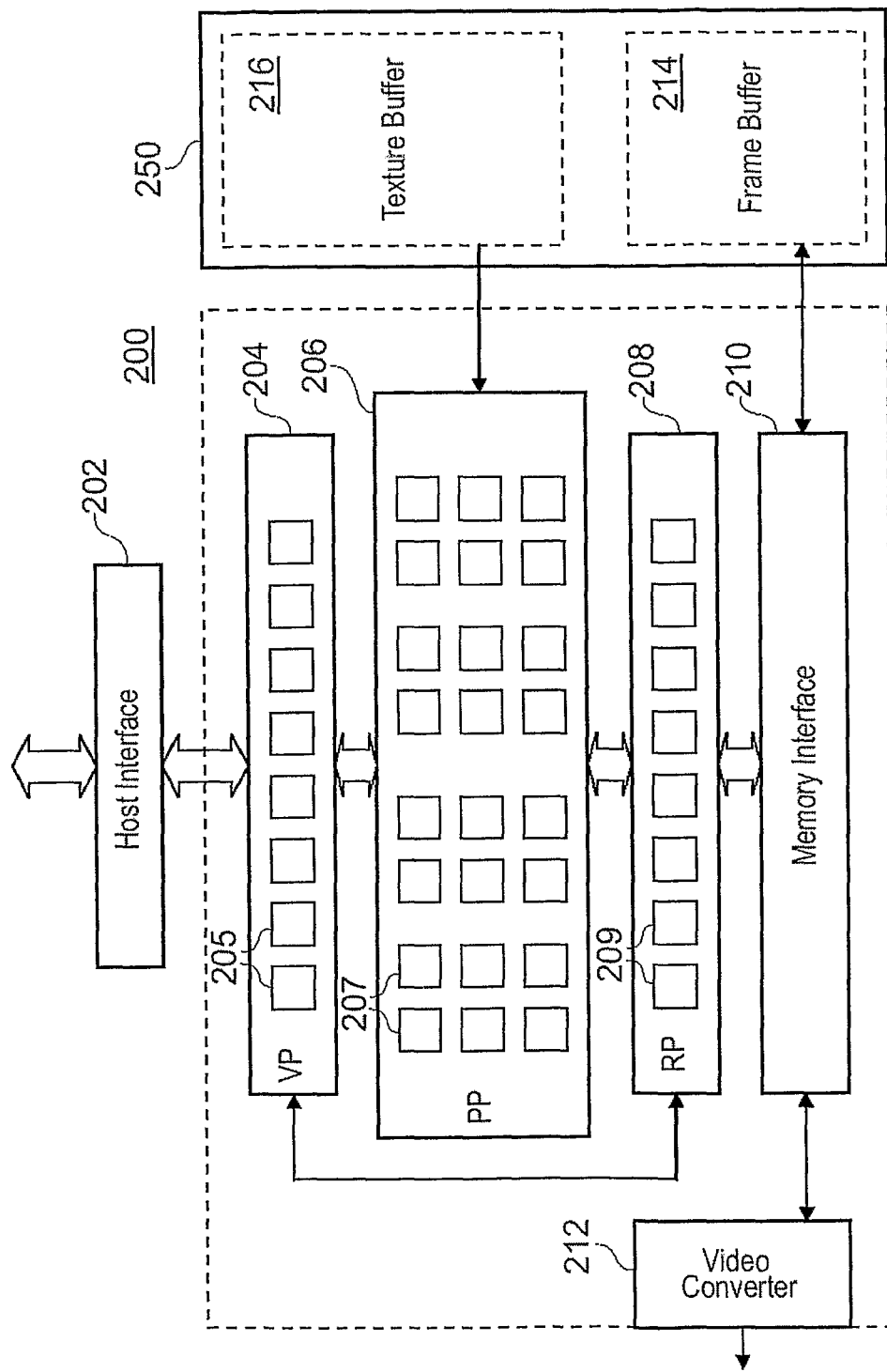
FIG. 6 is a schematic diagram of a video graphics processor.

Referring now to FIG. 6, the Reality Simulator graphics (RSX) unit 200 is a video accelerator based upon the NVidia® G70/71 architecture that processes and renders lists of commands produced by the Cell processor 100. The RSX unit 200 comprises a host interface 202 operable to communicate with the bus interface controller 170B of the Cell processor 100; a vertex pipeline 204 (VP) comprising eight vertex shaders 205; a pixel pipeline 206 (PP) comprising 24 pixel shaders 207; a render pipeline 208 (RP) comprising eight render output units (ROPs) 209; a memory interface 210; and a video converter 212 for generating a video output. The RSX 200 is complemented by 256 MB double data rate (DDR) video RAM (VRAM) 250, clocked at 600 MHz and operable to interface with the RSX 200 at a theoretical peak bandwidth of 25.6 GB/s. In operation, the VRAM 250 maintains a frame buffer 214 and a texture buffer 216. The texture buffer 216 provides textures to the pixel shaders 207, whilst the frame buffer 214 stores results of the processing pipelines. The RSX can also access the main memory 500 via the EIB 180, for example to load textures into the VRAM 250.

The vertex pipeline 204 primarily processes deformations and transformations of vertices defining polygons within the image to be rendered.

The pixel pipeline 206 primarily processes the application of colour, textures and lighting to these polygons, including any pixel transparency, generating red, green, blue and alpha (transparency) values for each processed pixel. Texture mapping may simply apply a graphic image to a surface, or may include bump-mapping (in which the notional direction of a surface is perturbed in accordance with texture values to create highlights and shade in the lighting model) or displacement mapping (in which the applied texture additionally perturbs vertex positions to generate a deformed surface consistent with the texture).

The render pipeline 208 performs depth comparisons between pixels to determine which should be rendered in the final image. Optionally, if the intervening pixel process will not affect depth values (for example in the absence of transparency or displacement mapping) then the render pipeline and vertex pipeline 204 can communicate depth information between them, thereby enabling the removal of occluded elements prior to pixel processing, and so improving overall rendering efficiency. In addition, the render pipeline 208 also applies subsequent effects such as full-screen anti-aliasing over the resulting image.

Both the vertex shaders 205 and pixel shaders 207 are based on the shader model 3.0 standard. Up to 136 shader operations can be performed per clock cycle, with the combined pipeline therefore capable of 74.8 billion shader operations per second, outputting up to 840 million vertices and 10 billion pixels per second. The total floating point performance of the RSX 200 is 1.8 TFLOPS.

Typically, the RSX 200 operates in close collaboration with the Cell processor 100; for example, when displaying an explosion, or weather effects such as rain or snow, a large number of particles must be tracked, updated and rendered within the scene. In this case, the PPU 155 of the Cell processor may schedule one or more SPEs 110A-H to compute the trajectories of respective batches of particles. Meanwhile, the RSX 200 accesses any texture data (e.g. snowflakes) not currently held in the video RAM 250 from the main system memory 500 via the element interconnect bus 180, the memory controller 160 and a bus interface controller 170B. The or each SPE 110A-H outputs its computed particle properties (typically coordinates and normals, indicating position and attitude) directly to the video RAM 250; the DMA controller 142A-H of the or each SPE 110A-H addresses the video RAM 250 via the bus interface controller 170B. Thus in effect the assigned SPEs become part of the video processing pipeline for the duration of the task.

In general, the PPU 155 can assign tasks in this fashion to six of the eight SPEs available; one SPE is reserved for the operating system, whilst one SPE is effectively disabled. The disabling of one SPE provides a greater level of tolerance during fabrication of the Cell processor, as it allows for one SPE to fail the fabrication process. Alternatively if all eight SPEs are functional, then the eighth SPE provides scope for redundancy in the event of subsequent failure by one of the other SPEs during the life of the Cell processor.

The PPU 155 can assign tasks to SPEs in several ways. For example, SPEs may be chained together to handle each step in a complex operation, such as accessing a DVD, video and audio decoding, and error masking, with each step being assigned to a separate SPE. Alternatively or in addition, two or more SPEs may be assigned to operate on input data in parallel, as in the particle animation example above.

Software instructions implemented by the Cell processor 100 and/or the RSX 200 may be supplied at manufacture and stored on the HDD 400, and/or may be supplied on a data carrier or storage medium such as an optical disk or solid state memory, or via a transmission medium such as a wired or wireless network or internet connection, or via combinations of these.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

In a typical video game that generates a surround-sound output, a game player (user) will have a virtual position within the game, as represented on a television screen. The virtual position is defined with respect to other entities and scenery within the virtual game environment. The PS3 machine running the game generates a virtual soundstage in which events and entities generating sound have positions which are defined relative to the virtual position of the user within the game environment. The player (as a person operating the controls) will have a physical position in a room, where that physical position is within a set of surround sound speakers. So, a general aim of the PS3 machine is to make use of the surround sound speakers so that the virtual soundstage, as heard at the user's physical position in the room, provides a good representation of the positions of events and entities within the game with respect to the player's virtual position in the game environment.

The generation of the virtual soundstage in which the apparent positions of sounds of enemies, friends, and other in-game events correspond to their positions within the virtual game environment can in turn affect how the sounds of such items are generated by the system. For example, if an enemy appears in the distance to the left of the player, their virtual position is in effect beyond the physical limits of the player's room. Consequently the game generates an associated low-level sound to be balanced between the front and rear left loudspeakers to give the impression of a far-field source. If the enemy runs toward the player and to their front, the sound will increase and the balance will shift towards the front left speaker and perhaps also the front central speaker. As the enemy gets close, perhaps running past to the immediate left of the user, they enter that part of the soundstage that is encompassed by the physical room of the user, and a combination of most of the loudspeakers is then used to localise the corresponding sound within the user's room. Moreover, if the user moves or rotates his position within the virtual environment, the virtual soundstage also moves or rotates accordingly, moving the apparent position of the sound either within the room or about its periphery, depending on the virtual distance.

Thus the desired effect is to make the player perceive that the characters and objects within the virtual environment are the sources of the sounds in the virtual soundstage as reproduced by the surround-sound system. However, to achieve this effect requires that the player is substantially located within the sweet-spot of the surround sound system.

By contrast, if the player of the game is to the left, right, front and/or rear of the current sweet spot, then particularly for in-game characters close to the player's viewpoint on screen, the apparent position of their sounds may be disassociated from their apparent position on screen. Moreover, as the player rotates his or her virtual (on-screen) viewpoint, the soundstage effectively rotates about an axis offset from the player, which can be disorientating.

Figure 7:
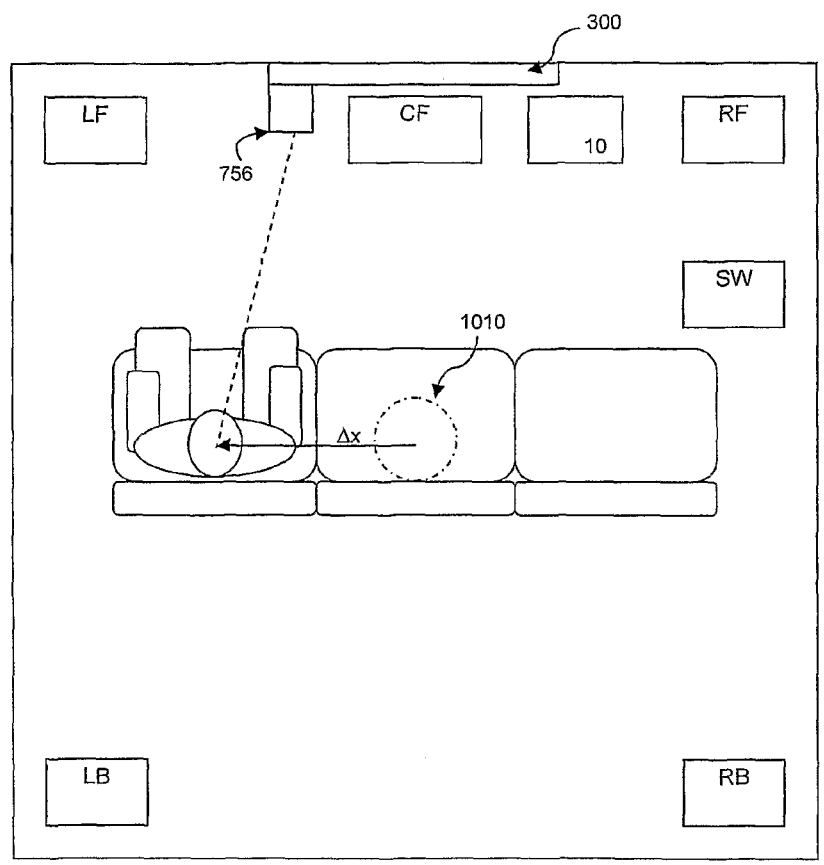
FIG. 7 is a schematic diagram illustrating the operation of an adaptive audio system in accordance with an embodiment of the present invention.

Referring now to FIG. 7, to compensate for the position of the player, independently of any calibration facility of the surround-sound amplifier, the PS3 10 is coupled either by a cable or wirelessly to the video camera 756 such as the Eye-Toy® camera. The camera relays video images to the PS3 which determines from the images the lateral displacement (i.e. difference) $\Delta x$ of the current player of the game relative to a known or assumed sweet spot 1010 (details for locating this sweet spot are given later). The displacement is achieved by recognising the presence of a person in the captured image, using known techniques (e.g. face recognition) and measuring the lateral position of the located person within the captured image. This position is compared with the position of the known or assumed sweet spot 1010 to establish the displacement $\Delta x$.

Using the player's observed displacement, the distances d1, . . . d6 can be recalculated, and delays to each channel corresponding to the changes in distance can be introduced. Where a distance has become smaller, a delay is added, and where a distance has become longer, an advance can be effectively introduced by delaying all the sound channels by a small, equal amount and then subtracting from this delay to achieve an effective advance. Note that a uniform delay of around 10 ms can generally be accommodated within the same video frame of a computer game (a frame rate of 50 frames per second equates to 20 ms per frame). A delay/advance of 10 ms translates to a change in position of up to 3 metres. Therefore delays and advances accounting for up to ±3 m deviation from the sweet spot can potentially be accounted for without dissociating the sound from the appropriate video frame. By adjusting the delays and advances in this manner, the acoustic signals from each speaker still arrive substantially simultaneously at the player despite the player's displacement from the original sweet spot. In other words, the sweet spot is effectively relocated to the observed position of the player. Similarly, the relative gains of the channels are also adjusted to compensate for the changes in distance to the player, so that the sound (amplitude) balance is also subjectively substantially unchanged. Thus as the player gets further from the sweet spot towards a given speaker, the level of that speaker is reduced, whilst the level of an increasingly distant speaker is increased. Optionally further amplitude changes beyond a predetermined limit can be prevented if the user exceeds a certain distance from the sweet spot.

Figure 8:
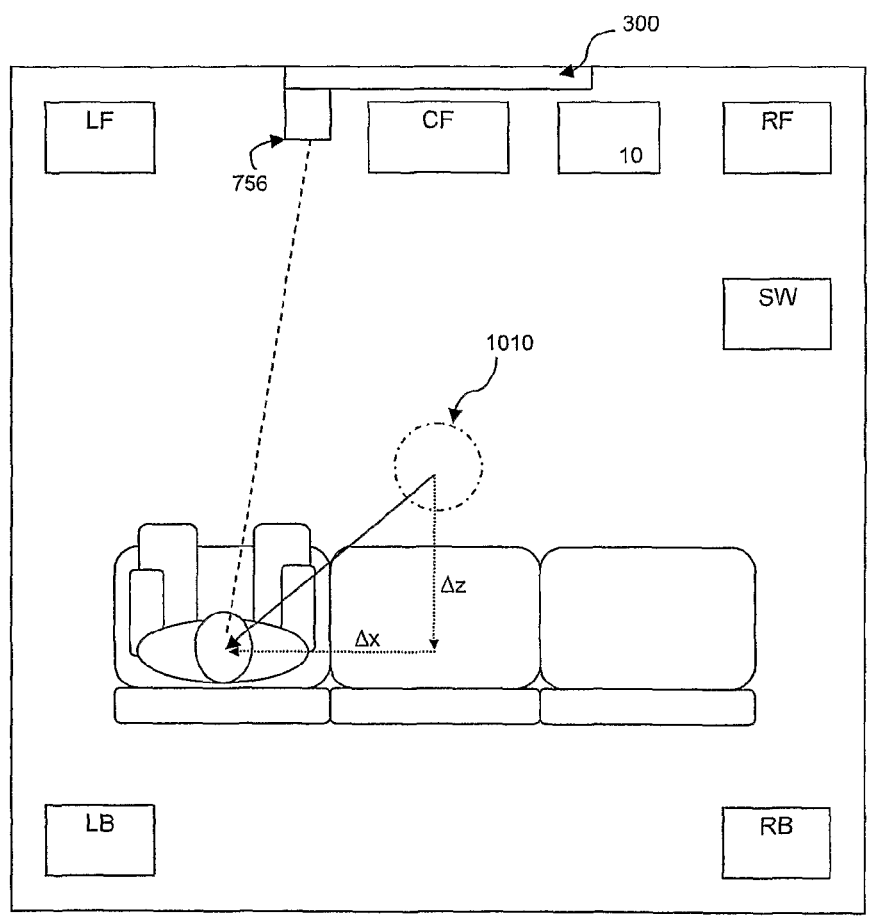
FIG. 8 is a schematic diagram illustrating the operation of an adaptive audio system in accordance with an embodiment of the present invention.

Whilst FIG. 7 shows a lateral displacement $\Delta x$, the displacement of the player axially (i.e. from front to back) $\Delta z$ may also be determined. Referring to FIG. 8, in one embodiment this may be approximated by tracking the relative size of the user's head within the captured image, and calculating axial distance as a function of head size. Preferably, in another embodiment of the present invention a next-generation video camera such as the so-called 'Z-Cam' may be used (also referred to generically as camera 756). The Z-Cam incorporates depth perception by illuminating the scene with a near-infrared grid pattern of light invisible to the user. The size of the grid as reflected from surfaces of the room indicates the distance of that surface. The distortion of the grid with respect to a reference grid pattern to is indicative of the topology of a surface. In this manner the Z-Cam can generate a depth map to complement the captured image. From this it is straightforward to determine the user's position within the room by taking their lateral position from the image in the manner described above, and their axial (front to back) position from the depth map, and then to compute delays and amplitude offsets to effectively centre the sweet spot (and hence the soundstage) over the user as described previously. Preferably, the axial position selected is that of the user's head.

The user's head may be identified by one of a number of known techniques, including facial recognition by use of neural networks or Hidden Markov Models, or comparisons using Eigenfaces (where facial images are broken down into weighted Eigen components, with the pattern of weights being distinctive to an individual face). The head (as opposed to the face) may also be identified simply with respect to the body using known techniques such as skeletal modelling or template matching.

It will be appreciated that other cameras capable of depth perception are envisaged within the scope of the present invention, such as stereoscopic cameras or cameras with an associated infra-red or ultrasonic tape measure.

It will also be appreciated that it is not necessary for the entire user to be captured within the video image, but enough to determine or estimate where the user's head is. Generally the user's head will be visible but not, for example, the lower legs. If, however, the user stands close to the camera so that their head cannot be seen, a template of a human body can be mapped to the visible portions of the user to estimate where their head is.

It will further be appreciated that in general the vertical, y, position of the user's head is not considered when calculating distances and delays. However, if the vertical positions of the loudspeakers are known (for example by input of position data by the user, or selection from among a set of common configurations), then the y position can also be factored in. Optionally it can be assumed that all the loudspeakers are about 1 metre above the ground, and the user's y position is included in the distance and delay calculations on that basis. In general the influence of the y position will be relatively small unless the x or z distance between the user and a loudspeaker is comparable to they distance.

Figure 9:
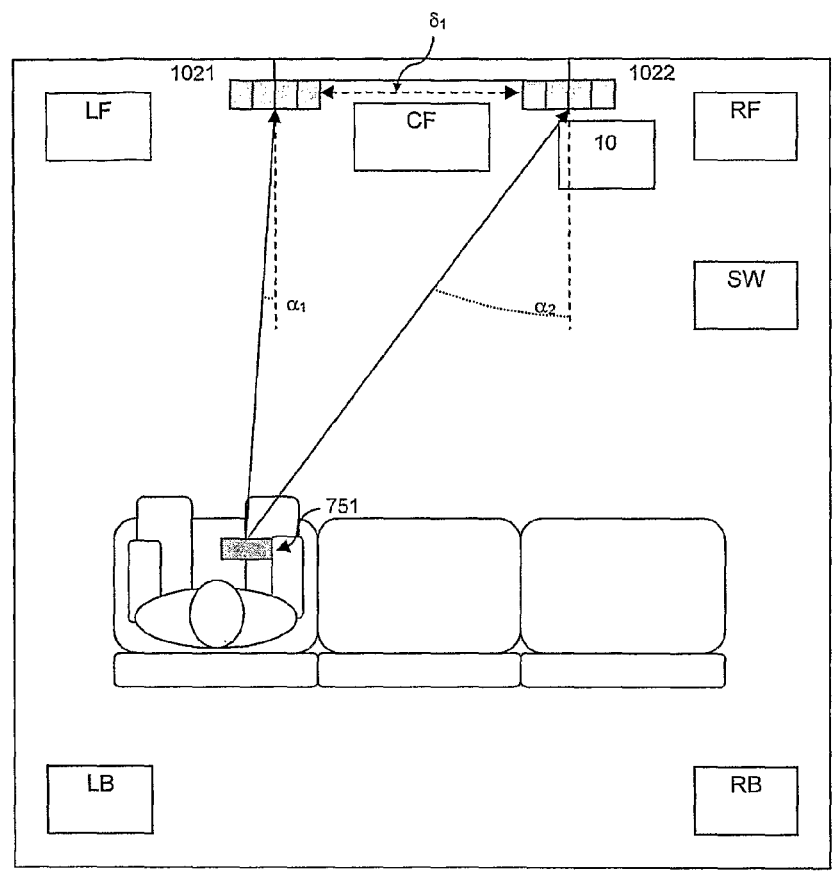
FIG. 9 is a schematic diagram illustrating the operation of an adaptive audio system in accordance with an embodiment of the present invention.

Referring now to FIG. 9, it will also be appreciated that, alternatively or in addition to a video sensor (e.g. the EyeToy or Z-Cam), other arrangements or devices to estimate the remote position of a user with respect to a sensor may be considered within the scope of the invention.

For example, controller 751 (which in operation is held by the user) communicates with the PS3 via a Bluetooth® radio signal. A pair of lateral phased arrays of radio sensors or antennas (1021, 1022) could therefore determine the lateral (x) and axial (z) position of a controller 751 by triangulating on the controller signal, by determining the point of intersection of determined reception angles $\alpha_1$ and $\alpha_2$ (determined by array sensor reception timing in a known manner) and given knowledge of the separation distance of the arrays $\delta_1$. This knowledge may be achieved for example by mounting the arrays in a housing of known dimensions. In principle, the arrays could also be sub-arrays of a single array, created by known techniques of processing the received array signals. More than two phased arrays could be used so as to provide further intersecting angles of reception. Clearly these techniques are not limited to BlueTooth radio signals, nor to the use of the controller as the radio transmitting device. For example, mobile telephone signals (from a mobile telephone in the user's pocket) could be used to detect the position of the user from phased array reception angles. Another option would be that the user wears a wireless microphone to enable the user to speak to other networked users of the game, the wireless microphone transmissions could be detected and localised by the phased arrays.

It can be assumed that a controller 751 transmitting control signals is being held by a current user of the PS3 and therefore provides a reasonable estimate of their position. Optionally, small x and possibly y offsets may be added based on predetermined notional (e.g. averaged) distances between a user's hand and head when seated, to further refine the estimate of the user's position.

A notable distinction between the prior art and the non-acoustic sensors in either the embodiment of a video camera or phased BlueTooth array is that the microphone of the prior art actually occupies and effectively defines the location of the eventual sweet spot, but is ignorant of the current position of the user (such systems have to rely on the assumption that the microphone occupies the eventual location of the user and so cannot account for temporary or unexpected changes in user position). By contrast, the camera or phased array are not themselves required to be at the eventual position of the sweet spot and do not define it, and instead are used to estimate the current position of the user in order to move the sweet spot to the user's current position. This provides a clear advantage by dynamically tracking the user's position, rather than statically calibrating on a sensor's position.

Recalibration of the sweet spot position in respect of displacements of the user relies on making adjustments relative to an initial position of the sweet spot. The estimation of this initial sweet spot position is now discussed. As noted previously, the sweet spot is defined as the point or small region in a room where acoustic signals from the loudspeakers, which were originally simultaneous source signals, are all co-incident; i.e. the point in the room where simultaneous source signals actually sound simultaneous. It also defines the centre point of the soundstage subjectively experienced by a user sitting in the sweet spot. For a stereo system, the sweet spot can be represented by a line half way between the two loudspeakers (ignoring further issues regarding sound dispersal). By extension, to a first approximation for a surround sound system (where no gain or delay adjustments have yet been made), the sweet spot may be assumed to be where the centreline between the left and right loudspeakers and the centreline between the front and rear loudspeakers intersect. A further approximation, assuming a symmetrical arrangement of loudspeakers around the centre of a room, is that the centre of the room will contain the sweet spot.

For the EyeToy camera, the lateral centreline of a room can be assumed by bisecting the rear wall as seen by the camera. The axial centreline can be estimated by bisecting the right or left wall—factoring in the field of view of the camera, the camera's own lateral offset from the centre of the room as observed with respect to the rear wall, and assuming the camera itself is within typically a metre of the front wall—to estimate how much of the right or left wall is missing. Alternatively the axial position can be obtained using the depth function of a Z-camera to determine the overall distance to the rear wall.

An alternative approximation is to identify (using known image recognition techniques such as template matching) a sofa or chair roughly centred in the field of view of the camera, on the grounds that the user will by default tend to sit in the sweet spot or have configured the sweet spot to coincide with this sitting position. The position of the sofa with respect to the rest of the room can be established by the EyeToy or Z-camera as described above for the centre of the room. Where there are two or more seats, the one closest to the lateral centre of the image can be assumed to correspond to the sweet spot.

Figure 10:
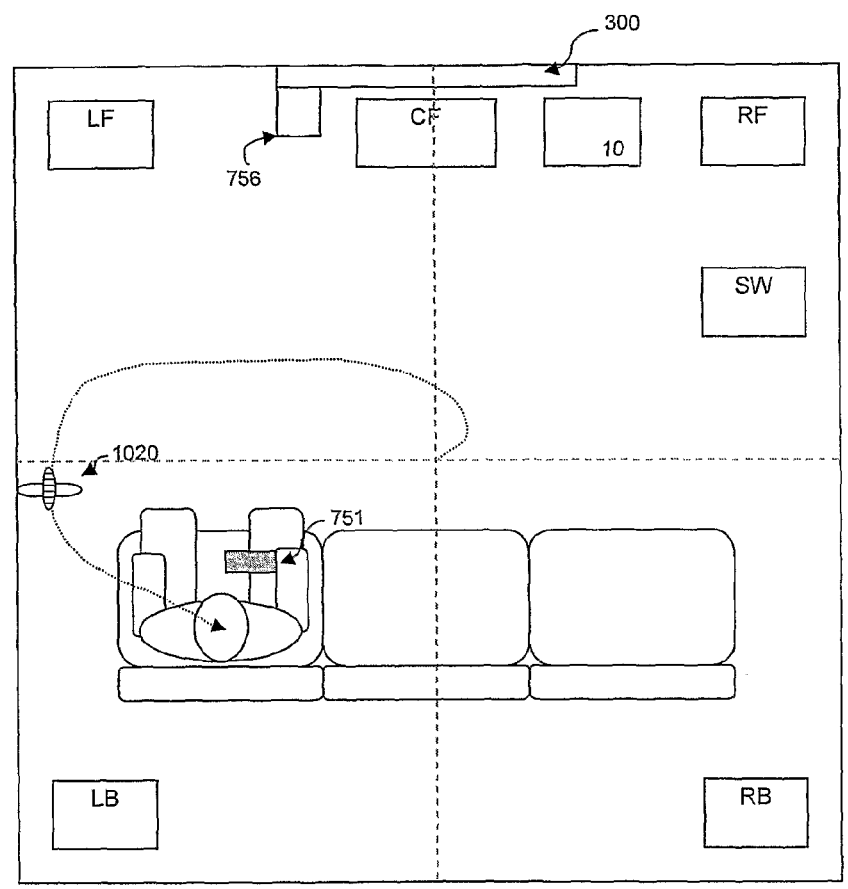
FIG. 10 is a schematic diagram illustrating the operation of an adaptive audio system in accordance with an embodiment of the present invention.

Referring now to FIG. 10, alternatively or in addition in an embodiment of the present invention a user can be asked to locate a sweet spot themselves by steering a virtual sound source until it is centred on their head. For example, they could be asked to use the game controller 751 to steer a virtual fly 1020 until it is hovering directly overhead. The steering effectively alters the relative delay times for each speaker until they act to localise a common, sound source (such as the sound of a fly) at the user's position. For example, to steer left, the delays to the left-hand loudspeakers are reduced whilst the delays to the right hand channels are increased, and vice-versa to steer right. The sub-woofer may be omitted for this purpose as it is not a left, right, front or rear channel as such. The relative channel levels can also be adjusted, particularly if the relative delays become large (i.e. close to 10 ms), to achieve localisation.

Alternatively or in addition, in an embodiment of the present invention the EyeToy, or preferably the Z-Cam, comprises an integrated microphone. Using this microphone, the PS3 can conduct a calibration of its output timings and optionally amplitudes and/or frequency equalisation in a conventional manner as described previously for amplifiers, but initially for the position of the camera rather than the listening position; in this way, the default sweet spot is recalibrated to the camera position. The PS3 then uses the camera in the manner described above to determine the position of the user relative to the camera and re-computes the calibration accordingly to place the sweet spot at the user's location.

For each of the above methods, once the delays required to achieve localisation at the user's current position are known, they can be recalculated based upon the user's observed displacement from that original position so as to maintain localisation of the sweet spot on the user. The recalculation may take place periodically or in response to a detected (physical) user movement of greater than a threshold distance.

Consequently the PS3 can track the user and centre the sweet spot and sound stage on them without further manual calibration.

It will be appreciated that optionally such tracking has a minimum user movement threshold, below which the sweet spot is not moved. Thus for example if the user merely leans or moves their head, optionally no adjustments are made as the user is still either within the sweet spot or very close to it.

Similarly it will be appreciated that optionally the tracking may be limited to a maximum effective speed for the sweet spot; for example, 1 metre per minute. Such a maximum may be implemented during ongoing tracking of a single player. Alternatively the tracking can be updated at whatever speed the available processing resources allow, and game design require. Optionally a smoothing function is included so that the estimated user position is smoothed or averaged from one estimate to the next.

In the above embodiments, in the event that the camera itself is moved, the PS3 can judge its relative displacement by comparison of the newly observed scene with a stored reference image of the scene. Axial displacement can be determined by the EyeToy by comparing the apparent size of the rear wall, whilst the Z-cam can measure its distance from the rear wall or some other reference object. The PS3 can then factor this movement into its estimate of the player's relative position.

Figure 1A:
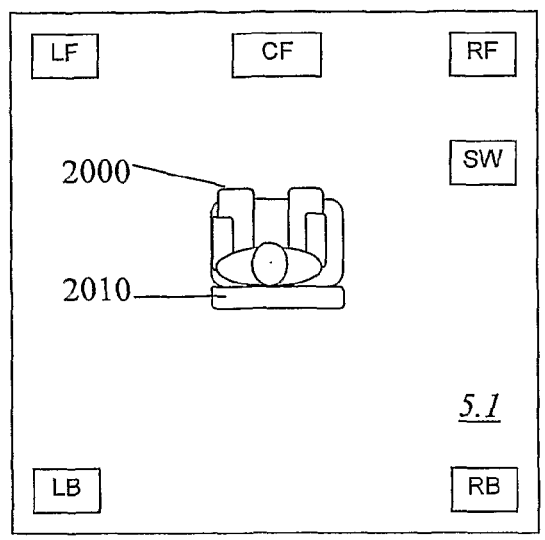
FIGS. 1A, 1B and 1C are schematic diagrams of so-called 5.1, 6.1 and 7.1 surround-sound speaker configurations respectively.
Figure 1B:
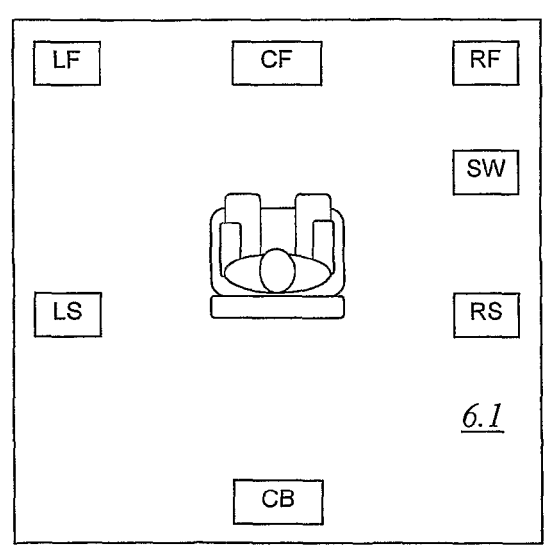
Figure 1C:
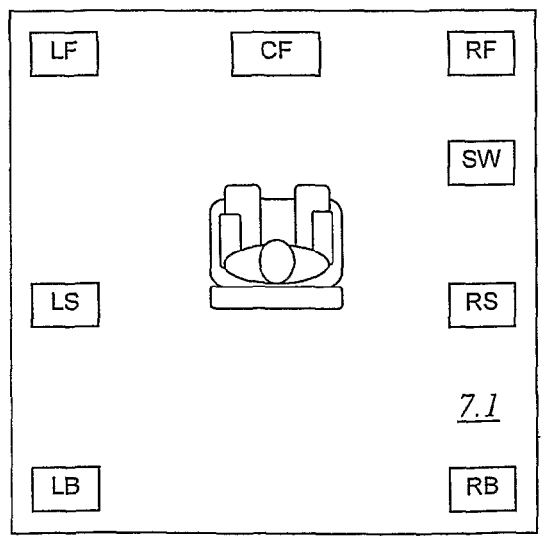
Figure 2:
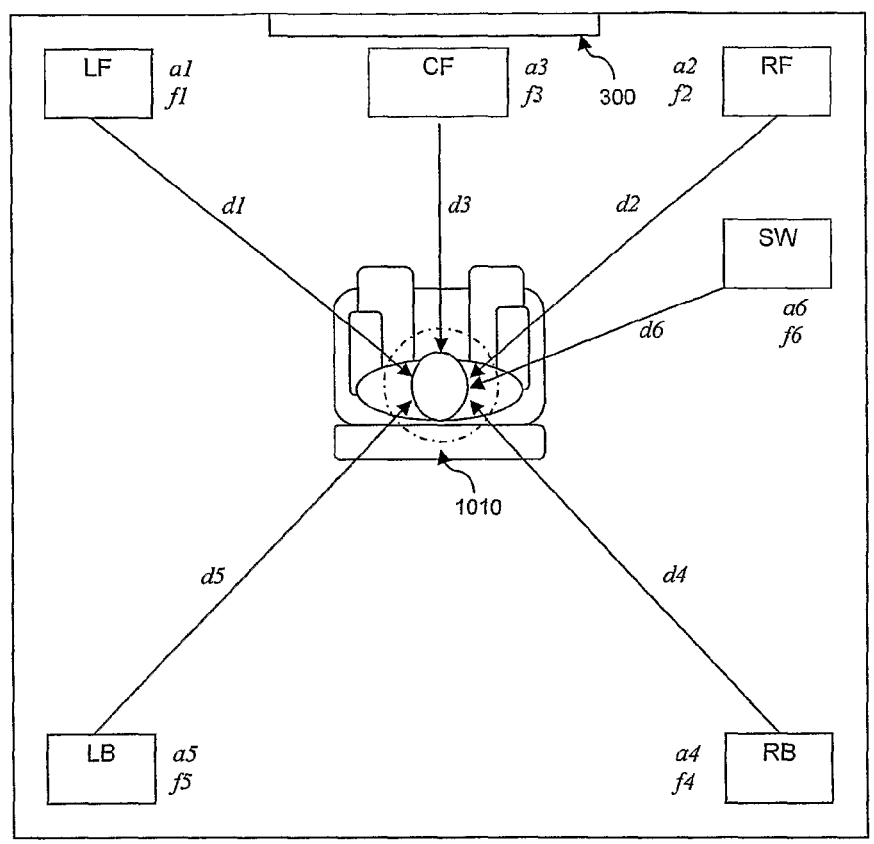
FIG. 2 is a schematic diagram of a 5.1 surround-sound speaker configuration with one listener.
Figure 3:
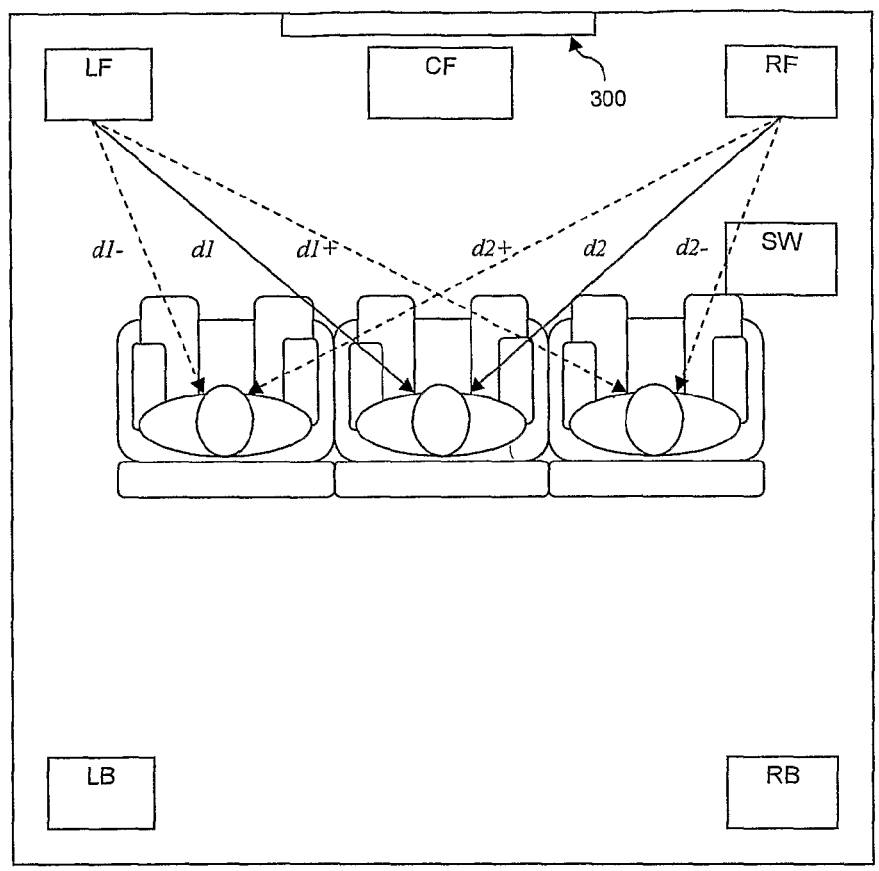
FIG. 3 is a schematic diagram of a 5.1 surround-sound speaker configuration with three listeners.

Returning to the scenario of FIG. 3 where two or more people wish to play a game, to embodiments of the present invention can capitalise on the fact that in many games only one player is playing the game at a time, and therefore the PS3 can move the sweet spot (and hence sound stage) to localise over each player in turn. This gives each player an improved immersion in the game when they need it.

For games where the players are playing simultaneously, for example in a split-screen mode, the system can generate two or more separate sweet spots/sound stages for each respective split-screen, and localise them for the respective player. Thus for example in a racing game each player's own car sound will be localised directly over them; other sounds common to both players (such a crowds to the size of the track) may be localised with respect to an average position between them, which can be considered the notional central player of the group.

A determination of which players are which, for the purposes of localising the sweet spot over one of them, can be obtained either from recognition of the game controllers and identification of which is being used (i.e. by motion detection), or forcing the status lights of one controller to blink momentarily via a Bluetooth command, thereby visually identifying the associated user, or asking one user to perform an action such as waving a hand, which can also be recognised by the PS3 via the captured video image.

Alternatively or in addition, optionally the sweet spot can be expanded at the cost of audio precision (i.e. defocusing of the soundstage) to encompass come or all of a group of users.

Figure 11:
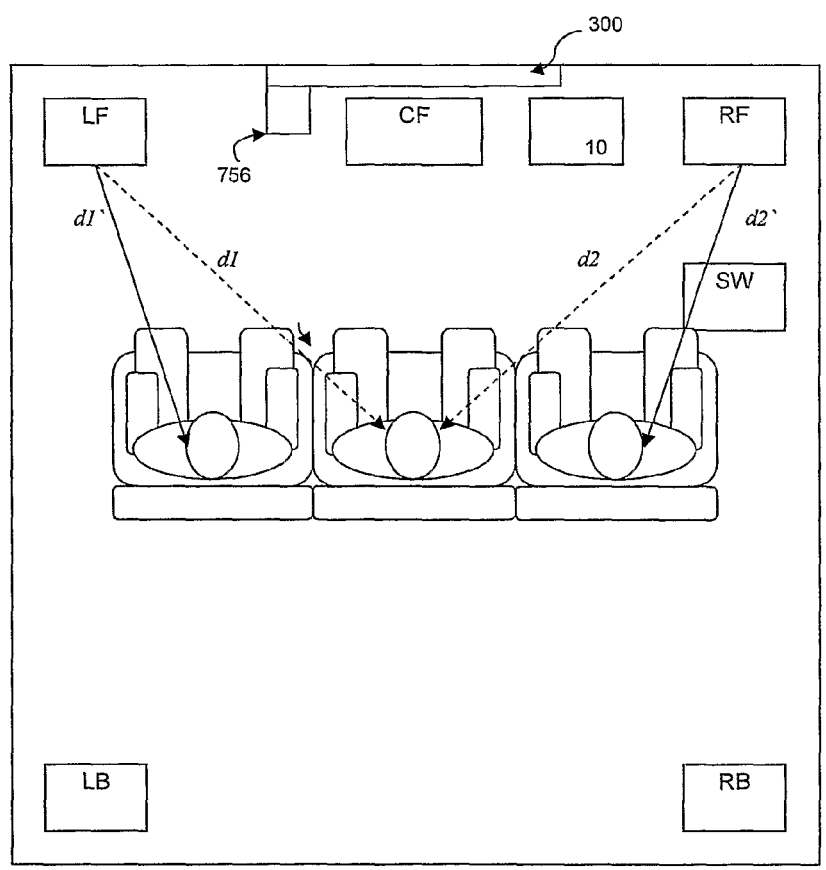
FIG. 11 is a schematic diagram illustrating the operation of an adaptive audio system in accordance with an embodiment of the present invention.

Referring now also to FIG. 11, if the users are distributed laterally (and possibly axially—not shown) in a room, an effective group area can be determined whose boundary is dependent upon the lateral and axial extent of the group (optionally excluding users beyond a threshold distance from the centre of the group). The timings are then adjusted so that the resulting acoustic signals, rather than converging simultaneously on a single point (the sweet spot), simultaneously reach the boundary of the group area.

Thus the relative delays are adjusted to encompass the group of people, as observed and identified by the PS3 in the image captured by the camera 756. So, delay applied to signals for the speaker LF, to correct for the distance d1, actually becomes a delay to correct for the distance d1'. Similarly the delay corresponding to the distance d2, applied to signals for the speaker RF, actually becomes a delay corresponding to the distance d2'. Similar adjustments would also be made in respect of the distances d3, ... d6 and optionally also for the sound levels (the gain) applied to each channel. It will be appreciated that where there is little axial distribution (as in FIG. 10) then the area simply becomes a one dimensional lateral range.

The effect of defocusing the sweet spot in this manner is to reduce the relative advance of the audio signal for people further from the original sweet spot, so reducing their incorrect perception of the soundstage as outlined previously.

It will also be appreciated that the above embodiments can serve to configure the sweet spot for the PS3 not just for games but also for playback of DVDs and Blu-ray disks, and also conventional music when using virtual surround sound processing. Again the PS3 can centre the sweet spot upon a single viewer in the room, or can calculate an average position or expanded sweet spot for two or more people by analysing a video image of the room and determining where the people are.

Where the amplifier has no automatic calibration system and/or has been calibrated badly or not at all, embodiments of the present invention also provide such automatic calibration, at least for media reproduced by the PS3.

Figure 12:
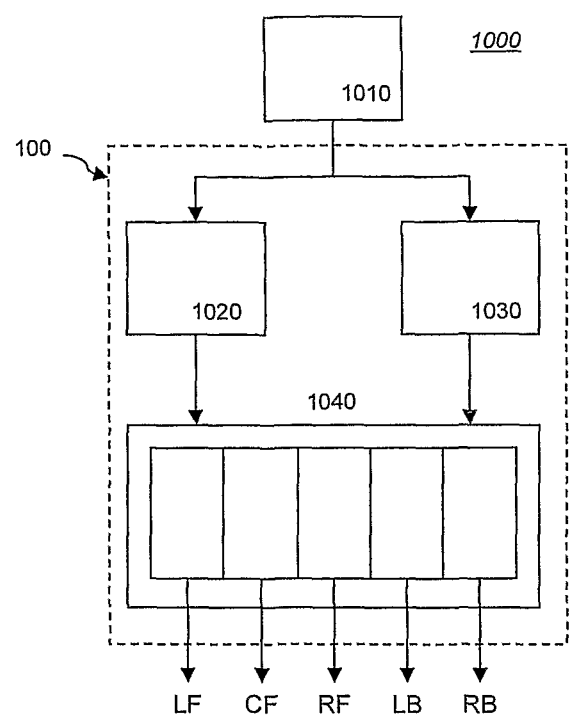
FIG. 12 is a schematic diagram of an adaptive audio system in accordance with an embodiment of the present invention.

Referring now to FIG. 12, in a summary embodiment of the present invention an audio processing apparatus 1000 comprises a non-acoustic sensor 1010, such as the video camera 756 or the phased array 1021, 1022 described above, and a processor 100. The processor provides a multi-channel delay 1040 operable to adjust delays applied to a plurality of audio signals; a coincident signal estimator 1020 operable to estimate a physical location at which acoustic signal from a plurality of loudspeakers are coincident (i.e. the sweet spot); and sensor analyser 1030 operable to estimate a physical location of a user from non-acoustic sensor data. In use, the multi-channel delay adjusts the output timing of sound data signals for reproduction by respective loudspeakers in accordance with the difference in the above estimated positions so as to move the effective position of the sweet spot to the estimated position of the user. Alternatively or in addition, a second processor, for example on a sound card 200, provides the multi-channel delay.

Figure 13:
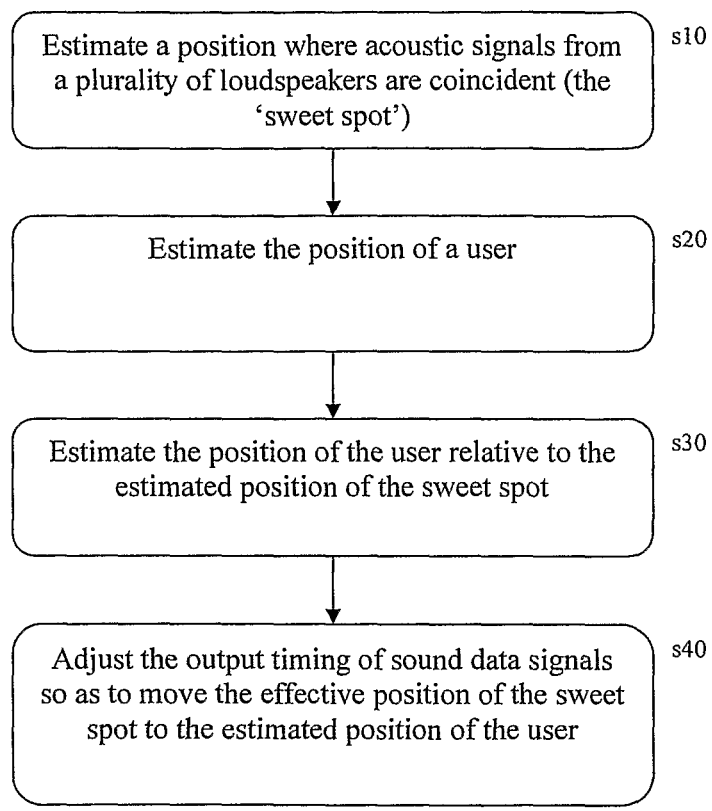
FIG. 13 is a flow diagram of a method of audio processing in accordance with an embodiment of the present invention.

Referring now to FIG. 13, a method of adaptive audio comprises:

in a first step s10, estimating a position where acoustic signals from a plurality of loudspeakers are coincident (hereafter referred to as the 'sweet spot');

in a second step s20, estimating the position of a user;

in a third step s30, estimating the position of the user relative to the estimated position of the sweet spot;

in a fourth step s40, adjusting the output timing of sound data signals for reproduction by respective loudspeakers in accordance with the difference in the above estimated positions so as to move the effective position of the sweet spot to the estimated position of the user.

It will be apparent to a person skilled in the art that variations in the above method corresponding to operation of the various embodiments of the apparatus described above are considered within the scope of the present invention, including but not limited to:

using pair of Bluetooth phased arrays to determine the position of the player;

using a video camera to determine the lateral position of the player;

using a video camera with depth perception to determine the lateral and axial position of the player;

estimating an initial sweet spot by asking the user to steer a virtual sound source over themselves; this known player position and the associated delays embody a coincident position;

estimating a default sweet spot from an analysis of room dimensions;

estimating a default sweet spot by identifying an item of furniture within the field of view of the camera;

estimating an initial sweet spot by conventional calibration using a microphone, but located at the camera position rather than the listening position;

shifting the sweet spot to centre on one of several respective players of a game when it is that player's turn;

Generating and overlaying several offset sweet spots for different respective sound sources when several players are playing simultaneously, with respect to their own displayed point of view (i.e. split-screen)

Localising the sweet spot to centre on the viewer of a movie, or on the centroid of a group of viewers, or expanding the sweet spot (defocusing the soundstage) to encompass a group of viewers.

It will be appreciated that the analysis of the video images, depth data and any audio timing and level adjustment may be carried out by the PS3 under instruction from a suitably coded computer program.

Thus adaptations to existing parts of a conventional equivalent device may be implemented at least in part in the form of a computer program product comprising processor implementable instructions stored on a data carrier such as a floppy disk, optical disk, hard disk, PROM, RAM, flash memory or any combination of these or other storage media, or transmitted via data signals on a network such as an Ethernet, a wireless network, the Internet, or any combination of these of other networks, or realised in hardware as an ASIC (application specific integrated circuit) or an FPGA (field programmable gate array) or other configurable or bespoke circuit suitable to use in adapting the conventional equivalent device.

The invention claimed is:

1. A method of audio processing in which a video camera is used to detect a position of a user relative to a position of the video camera, the video camera having an associated microphone located substantially at the position of the camera and the camera being placed in a position other than the user's listening position, the method comprising the steps of:

calibrating, by one or more processors, the position of the video camera relative to a plurality of loudspeakers by (i) generating test signals for the plurality of loudspeakers; (ii) measuring acoustic signals from the plurality of loudspeakers with the microphone located substantially at the position of the camera; and (iii) adjusting output timing of sound data signals for reproduction by respective ones of the plurality of loudspeakers so that simultaneous source ones of the sound data signals are then timed to cause corresponding ones of the acoustic signals from the respective loudspeakers to reach the microphone substantially simultaneously so as to set a position where the acoustic signals from selected ones of the plurality of loudspeakers are coincident at a sweet spot to the position of the camera;

detecting a position of the user relative to the camera from images captured by the camera, thereby estimating the position of the user relative to an estimated position of the sweet spot; and adjusting, by the one or more processors, the output timing of the sound data signals for reproduction by the respective loudspeakers in accordance with the estimated position of the user relative to the position of the camera so as to move the estimated position of the sweet spot to the estimated position of the user.

2. A method of audio processing according to claim 1, further comprising the steps of:

estimating the position of the sweet spot; and estimating the position of the user.

3. A method according to claim 2, in which the step of estimating the position of the user comprises capturing and analysing data from a non-acoustic sensor.

4. A method according to claim 2, in which the step of estimating the position of the user comprises capturing an image encompassing some or all of the user, and analysing the image to identify the position of the user.

5. A method according to claim 4, comprising the step of augmenting analysis of one of the captured images by the use of distance data corresponding to captured image data and obtained from an image capture device further equipped with a distance measuring arrangement.

6. A method according to claim 2, in which the step of estimating the position of the user comprises receiving a radio signal from a radio transmitting device carried by the user by two or more phased array antennas, and analysing respective angles of reception at the phased arrays to detect a position of transmission of the radio signal.

7. A method according to claim 2, in which the step of estimating the position of the user relative to the estimated position of the sweet spot comprises comparing the estimated position of the user with the estimated position of the sweet spot to determine the relative difference in position.

8. A method according to claim 2, in which the step of estimating the position of the sweet spot comprises:
capturing an image of a room housing the loudspeakers;
estimating a centre point of the room by analysis of the captured image; and
estimating the position of the sweet spot as the centre point of the room.

9. A method according to claim 2, in which the step of estimating the position of the sweet spot comprises:
capturing an image of a room housing the loudspeakers;
analysing the captured image to identify a seat, or if there are two or more seats, the seat closest to a lateral centre of the captured image; and
estimating the position of the identified seat by analysis of the captured image.

10. A method according to claim 8, comprising the step of augmenting analysis of one of the captured images by the use of distance data corresponding to captured image data and obtained from an image capture device further equipped with a distance measuring arrangement.

11. A method according to claim 2, the method being carried out by an entertainment device operable to interact with two or more users.

12. A method according to claim 11, where the two or more users interact with the entertainment device in turn, and in which the step of adjusting the output timing comprises moving an effective position of the sweet spot to the position of the currently interacting user.

13. A method according to claim 11, where the two or more users interact with the entertainment device simultaneously, and in which the step of adjusting the output timing comprises:
adjusting the output timing of some or all of respective sound data signals associated with each respective user's interaction in accordance with their respective sweet spots.

14. A method according to claim 2, where two or more users are identified, in which the step of estimating the position of the sweet spot relative to the estimated position of the user comprises:
identifying a plurality of users within a captured video image;
defining a notional boundary dependent upon a lateral and axial extent of a group of some or all of these users; and
adjusting the output timing of the sound data signals for reproduction by the respective ones of the plurality of loudspeakers in accordance with a difference between the estimated position of the sweet spot and the notional boundary, so that resultant acoustic signals reach the notional boundary substantially simultaneously.

15. An entertainment device, comprising:
a video camera configured to detect a position of a user relative to a position of the video camera;
a microphone associated with the video camera, the microphone being located substantially at the position of the video camera and the video camera being placed in a position other than the user's listening position; and
a processor operatively coupled to the camera and the microphone, the processor being configured to:
calibrate the position of the video camera relative to a plurality of loudspeakers by (i) generating test signals for the plurality of loudspeakers; (ii) measuring acoustic signals from the plurality of loudspeakers with the microphone located substantially at the position of the camera; and (iii) adjusting output timing of sound data signals for reproduction by respective ones of the plurality of loudspeakers so that simultaneous source ones of the sound data signals are then timed to cause corresponding ones of the acoustic signals from the respective loudspeakers to reach the microphone substantially simultaneously so as to set a position where the acoustic signals from selected ones of the plurality of loudspeakers are coincident at a sweet spot to the position of the camera;
detect a position of the user relative to the camera from images captured by the camera, thereby estimating the position of the user relative to an estimated position of the sweet spot; and
adjust the output timing of the sound data signals for reproduction by the respective loudspeakers in accordance with the estimated position of the user relative to the position of the camera so as to move the estimated position of the sweet spot to the estimated position of the user.

16. An entertainment device according to claim 15, comprising:
a non-acoustic sensor;
a coincident signal estimator operable to estimate a physical location at which acoustic signals from the plurality of loudspeakers are coincident at the sweet spot;
a sensor analyser operable to estimate a physical location of the user from non-acoustic sensor data generated by the non-acoustic sensor; and wherein
the processor is operable to adjust the output timing of the sound data signals for reproduction by respective ones of the plurality of loudspeakers in accordance with a difference between the estimated position of the user and the estimated position of the sweet spot so as to move an effective position of the sweet spot towards the estimated position of the user.

17. An entertainment device according to claim 16, in which the non-acoustic sensor is the video camera.

18. An entertainment device according to claim 17, in which the video camera comprises a distance measuring arrangement.

19. An entertainment device according to claim 17, in which the video camera includes the microphone.

20. An entertainment device according to claim 16, in which the non-acoustic sensor is a phased radio array.

21. A non-transitory computer-readable storage medium having instructions stored thereon, the instructions, when executed by a processor, cause the processor to perform method of audio processing in which a video camera is used to detect a position of a user relative to a position of the video camera, the video camera having an associated microphone located substantially at the position of the camera and the camera being placed in a position other than the user's listening position, the method comprising the steps of:
calibrating the position of the video camera relative to a plurality of loudspeakers by (i) generating test signals for the plurality of loudspeakers; (ii) measuring acoustic signals from the plurality of loudspeakers with the microphone located substantially at the position of the camera; and (iii) adjusting output timing of sound data signals for reproduction by respective ones of the plurality of loudspeakers so that simultaneous source ones of the sound data signals are then timed to cause corresponding ones of the acoustic signals from the respective loudspeakers to reach the microphone substantially simultaneously so as to set a position where the acoustic signals from selected ones of the plurality of loudspeakers are coincident at a sweet spot to the position of the camera;

detecting a position of the user relative to the camera from images captured by the camera, thereby estimating the position of the user relative to an estimated position of the sweet spot; and adjusting the output timing of the sound data signals for reproduction by the respective loudspeakers in accordance with the estimated position of the user relative to the position of the camera so as to move the estimated position of the sweet spot to the estimated position of the user.

22. A non-transitory computer-readable storage medium according to claim 21, the method further comprising:

estimating the position of the sweet spot; and
estimating the position of the user.

\* \* \* \* \*